US 008443119B1

(12) United States Patent
Limaye et al.

(10) Patent No.: US 8,443,119 B1
(45) Date of Patent: May 14, 2013

(54) SYSTEM AND METHOD FOR DISABLING AUTO-TRESPASS IN RESPONSE TO AN AUTOMATIC FAILOVER

(75) Inventors: Prasad Limaye, Maharashtra (IN);
Mukul Kumar, Maharashtra (IN);
Mayuresh Phadke, Maharashtra (IN)

(73) Assignee: Symantec Operating Corporation, Mountain View, CA (US)

( * ) Notice: Subject to any disclaimer, the term of this patent is extended or adjusted under 35 U.S.C. 154(b) by 1727 days.

(21) Appl. No.: 10/787,653

(22) Filed: Feb. 26, 2004

(51) Int. Cl.
*G06F 13/00* (2006.01)

(52) U.S. Cl.
USPC .......... 710/31; 710/5; 710/8; 710/15; 710/32; 710/33

(58) Field of Classification Search .................. 710/5, 8, 710/15, 31, 32, 33
See application file for complete search history.

(56) References Cited

U.S. PATENT DOCUMENTS

| | | | |
|---|---|---|---|
| 6,578,158 B1 * | 6/2003 | Deitz et al. ...................... | 714/11 |
| 7,042,837 B1 * | 5/2006 | Cassiday et al. .............. | 370/225 |
| 2003/0126315 A1 | 7/2003 | Tan et al. .......................... | 710/1 |
| 2004/0107300 A1 * | 6/2004 | Padmanabhan et al. .......... | 710/1 |

\* cited by examiner

*Primary Examiner* — Idriss N Alrobaye
*Assistant Examiner* — Jasjit Vidwan
(74) *Attorney, Agent, or Firm* — Campbell Stephenson LLP

(57) ABSTRACT

Auto-trespass can be at least temporarily disabled subsequent to an automatic failover. The automatic failover exchanges roles between an active path and a passive path, such that the passive path becomes the active path and vice versa. By disabling auto-trespass, hosts that are unaware that the automatic failover has occurred will not trigger another failover when those hosts attempt to perform I/O operations via the formerly-active path. This can reduce performance decreases that would otherwise occur due to the active role being traded in a "ping-pong" manner between the paths.

26 Claims, 5 Drawing Sheets

SYSTEM AND METHOD FOR DISABLING AUTO-TRESPASS IN RESPONSE TO AN AUTOMATIC FAILOVER

FIELD OF THE INVENTION

This invention relates to storage systems and, more particularly, to storage systems that provide multipathed active/passive access to a storage device by employing auto-trespass techniques for path failovers.

BACKGROUND

In order to eliminate single points of failure, redundant components are often included in data storage systems. Redundant components allow a system to continue to operate, despite a component failure. For example, multiple array controllers are often included in storage arrays. Each of these array controllers can be configured to automatically take over the operations of a failed array controller.

When a storage system includes redundant components, the redundant components often present several different paths to a storage device. For example, if a storage array has multiple controllers, each controller can be associated with a path (or a set of paths, if multiple ports are connected to each controller) to a storage volume implemented within the storage array. Dynamic Multipathing (DMP) techniques (typically implemented in software) allow a host to detect and use these different paths when accessing the storage device.

The manner in which redundant paths to a storage device can be used varies depending on whether the devices that are associated with those paths are configured to allow active/active access or active/passive access. If active/active access is provided, Input and/or Output (I/O) operations to the storage device are allowed via paths associated with different devices simultaneously (e.g., paths associated with different storage array controllers can be active at the same time). If active/passive access is provided, I/O operations to the storage device are only allowed via one controller at a time (i.e., at any given time, one or more paths associated with one controller are active while paths associated with all other controllers are passive). If active/active access is allowed, DMP software executing on a host can distribute the host's I/O operations to the storage device over multiple paths. In both active/active and active/passive mode, DMP software can detect when errors are encountered on a path and retry failed I/O operations on the remaining paths.

In active/passive mode, the DMP software on a host will retry an I/O operation on a passive path if an error is detected on the active path. In order for the I/O operation to be performed via the passive path, either the paths need to provide auto-trespass functionality or the DMP software needs to know the vendor-specific failover command necessary to initiate a failover from the active path to a passive path. Since DMP software is often designed for use in heterogeneous environments with a variety of different vendors' products, the latter solution is often undesirable because it introduces a substantial amount of implementation dependence into what is intended to be implementation-agnostic DMP software.

When active/passive access is provided, devices (e.g., hardware and/or software components) that are associated with different paths to the storage device often include auto-trespass functionality. Auto-trespass functionality provides these devices with the ability to automatically failover from a device associated with the active path to a device associated with a passive path in response to a host sending an I/O command to the storage device via the passive path. For example, two storage array controllers are each associated with a respective path to a storage device, and the two storage array controllers can coordinate to provide active/passive access to the storage device via their respective paths. At any given time, one storage array controller is active and the other is passive. If a host sends an I/O command via the passive path associated with the passive storage array controller, the passive storage array controller will automatically switch roles with the active storage array controller.

Occasionally, problems can arise due to the use of auto-trespass mode in systems having multiple hosts. In particular, if one host detects an error on the active path and retries the I/O operation on the passive path, the controller defining the passive path will initiate a failover in order to become the active controller. If the hosts do not coordinate among each other, another host may continue to assume that the formerly-active path is still active, and that host may then initiate an I/O operation by sending an I/O command via that path, which is now passive. This may lead to another failover, back to the originally-active path. This pattern can continue, such that each time a different host accesses the storage device, another failover between paths is initiated, causing the active role to be transferred in a "ping-pong" manner between the controllers that are associated with the paths. Each failover may take a significant amount of time, and thus several successive failovers may have a detrimental effect on performance.

SUMMARY

Various embodiments of systems and methods are disclosed for at least temporarily disabling auto-trespass subsequent to an automatic failover between paths. The automatic failover exchanges roles between an active path and a passive path, such that the passive path becomes the active path and vice versa. By disabling auto-trespass, hosts that are unaware that the automatic failover has occurred will not trigger another failover when those hosts attempt to perform I/O operations via the formerly-active path. Accordingly, performance decreases that would otherwise occur due to the active role being traded in a "ping-pong" manner between the paths can be reduced.

In some embodiments, a method involves detecting an auto-trespass failover from a first path to a second path. The auto-trespass failover is performed in response to an I/O command being sent via the second path. The second path is a passive path prior to the auto-trespass failover. The method also involves at least temporarily inhibiting auto-trespass failovers between the first path and the second path subsequent to the auto-trespass failover.

The foregoing is a summary and thus contains, by necessity, simplifications, generalizations and omissions of detail; consequently, those skilled in the art will appreciate that the summary is illustrative only and is not intended to be in any way limiting. The operations disclosed herein may be implemented in a number of ways, and such changes and modifications may be made without departing from this invention and its broader aspects. Other aspects of the present invention, as defined solely by the claims, will become apparent in the non-limiting detailed description set forth below.

BRIEF DESCRIPTION OF THE DRAWINGS

A more complete understanding of the present invention may be acquired by referring to the following description and the accompanying drawings, in which like reference numbers indicate like features.

Figure 1:
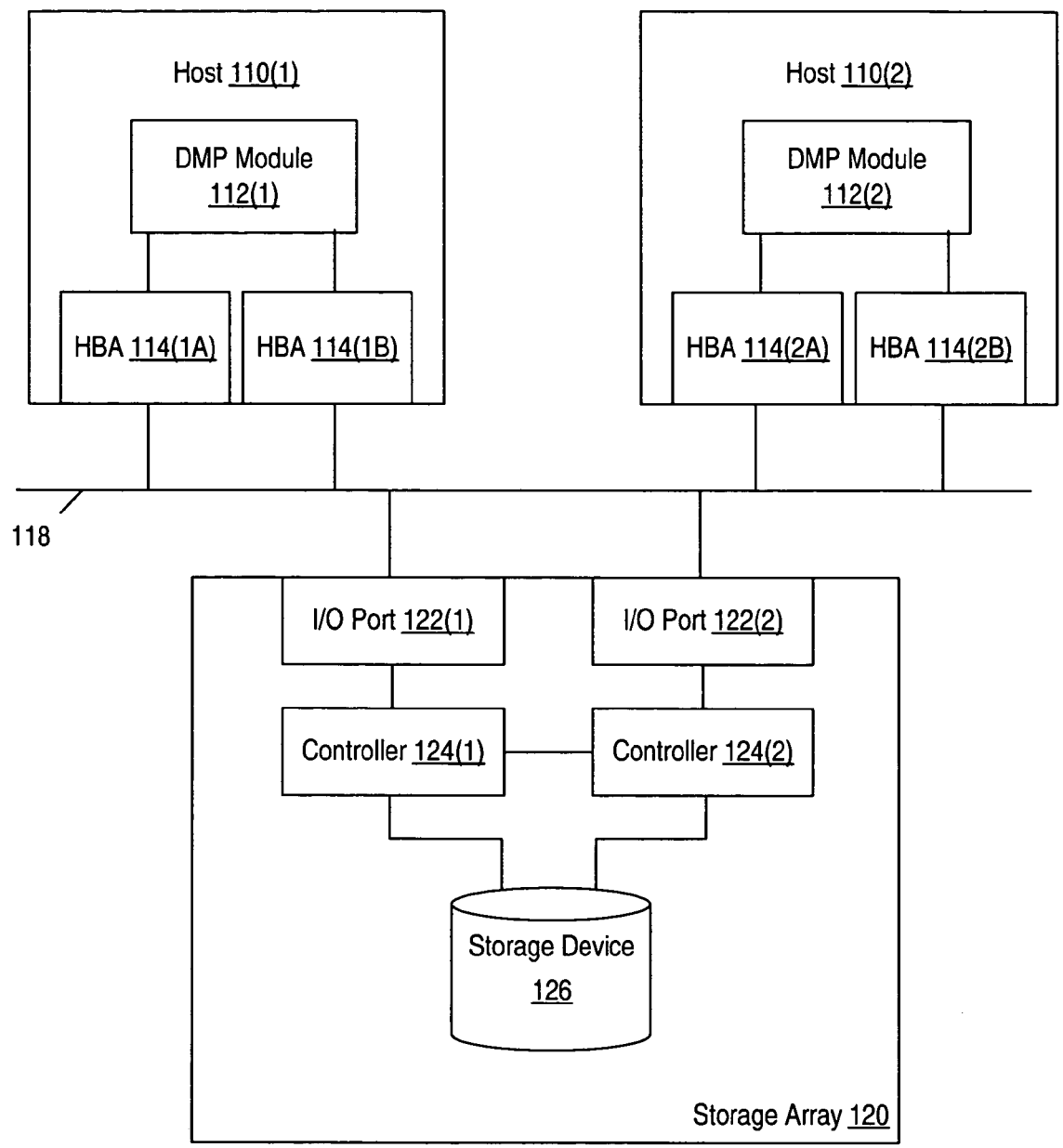
FIG. 1 is a block diagram of a storage system that includes an A/P (active/passive) storage array, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

Controllers provide auto-trespass functionality by coordinating to perform an automatic failover from an active controller to a passive controller when a host initiates an I/O operation via a passive path. As a result of the automatic failover, the passive controller and the active controller switch roles (i.e., the passive controller becomes the active controller, and vice versa). Additionally, after the automatic failover, the auto-trespass functionality of one or more of the controllers (e.g., the passive controller that was the active controller prior to the automatic failover) is disabled. The controller(s) can re-enable auto-trespass at some subsequent time. During the time that auto-trespass is disabled, an automatic failover will not be initiated if a host attempts an I/O operation via the passive controller. Instead, any host that attempts an I/O operation via the passive controller will detect an error, causing the host to retry the I/O operation on a path associated with another controller. By at least temporarily disabling auto-trespass subsequent to an automatic failover, "ping-ponging" between controllers (and the corresponding decrease in storage system performance) can be avoided. Additionally, by causing hosts that attempt I/O operations on the passive path to detect errors, the hosts can be forced to reroute the I/O operations on the active path that was established by the automatic failover.

FIG. 1 is a block diagram of a storage system that provides several hosts with shared A/P (active/passive) access to a storage device. The storage system includes two hosts 110(1) and 110(2). Host 110(1) includes Dynamic Multipathing (DMP) module 112(1), Host Bus Adapter (HBA) 114(1A), and HBA 114(1B). Similarly, host 110(2) includes DMP module 112(2), HBA 114(2A), and HBA 114(2B). DMP modules 112(1) and 112(2) are implemented in software in some embodiments. It is noted that throughout this description, components identified by the same numeral, followed by a unique parenthetical identifier (e.g., hosts 110(1) and 110(2)) are collectively referred to by that numeral alone (e.g., hosts 110).

Interconnect 118 couples hosts 110 to storage array 120. A variety of different types of interconnects can be used to couple hosts 110 to storage array 120. For example, interconnect 118 is a SAN (Storage Area Network) in some embodiments. In other embodiments, interconnect 118 is implemented using direct connections between hosts 110 and storage array 120. In yet other embodiments, interconnect 118 is an IP (Internet Protocol) network.

Storage array 120 is a multi-ported storage array that includes I/O port 122(1), I/O port 122(2), controller 124(1), controller 124(2), and storage device 126 (it is noted that several additional storage devices will typically also be included in storage array 120, but for simplicity, only a single such device is illustrated). I/O ports 122(1) and 122(2) communicate I/O commands and data via interconnect 118. One of the controllers 124(1) and 124(2) is associated with each I/O port 122(1) and 122(2), and each controller generally handles I/O commands addressed to storage device 126 that are received via the associated I/O port. For example, controller 124(1) handles I/O commands received via I/O port 122(1), and controller 124(2) handles I/O commands received via I/O port 122(2). Controllers 124(1) and 124(2) are connected so that they can coordinate failovers and/or coordinate the values of various information (e.g., controllers 124(1) and 124(2) can coordinate the contents of their caches in some embodiments).

Each host 110 can execute one or more applications and other software such as operating systems and file systems. Software executing on hosts 110 can initiate I/O operations to storage devices such as storage device 126. Hosts 110 can also execute volume manager software, which enables physical resources in the computing system to be managed as logical devices. An example of volume manager software is the VERITAS Volume Manager™ product provided by VERITAS Software Corporation.

Hosts 110 use DMP modules 112(1) and 112(2) to take advantage of the fact that storage array 120 has more than one I/O port. DMP modules 112 can enable greater reliability in each host by implementing automatic path rerouting. In the event of a loss of one connection to a storage device, a DMP module automatically routes I/O operations over another available connection to the storage device. For example, if DMP module 112(1) detects an error when host 110(1) is accessing storage device 126 via the path that passes through controller 124(1), DMP module 112(1) can automatically reroute I/O operations to storage device 126 over the alternative path, which passes through controller 124(2). DMP modules 112 can detect a potential path failure by detecting a variety of different errors, including device-level errors (e.g., SCSI errors or timeouts) as well as interconnect-level errors (e.g., fabric login errors).

HBAs 114(1A), 114(1B), 114(2A), and 114(2B) each provide a hardware interface between the host and interconnect 118, which is typically implemented as a Fibre Channel network. Hosts 110 can each have multiple HBAs, as shown in FIG. 1, to provide redundancy and/or to take better advantage of storage devices having multiple ports. DMP modules 112 (1) and 112(2) can each associate a different HBA in their respective hosts with each one of the I/O ports of storage array 120. For example, DMP module 112(1) can use HBA 114 (1A) to send I/O commands to storage device 126 via I/O port 122(1), and DMP module 122(2) can use HBA 114(2A) to send I/O commands to storage device 126 via I/O port 122(1). Similarly, DMP module 122(1) can use HBA 114(1B) to send I/O commands to storage device 126 via I/O port 122(2), and DMP module 122(2) can use HBA 114(2B) to send I/0 commands to storage device 126 via I/O port 122(2). It is noted that some embodiments include a single HBA per host (e.g., each host can include one single or multi-ported HBA) instead of having multiple HBAs per host.

Storage device 126 includes one or more storage devices, such as disk drives, that are each accessible by both controllers 124(1) and 124(2). In one embodiment, storage device 126 is referred to as a logical unit, or LUN. A LUN is generally an indivisible unit presented by a storage device to its host(s). Logical unit numbers, also referred to as LUNs, are typically assigned to each logical unit in an array so the host can address and access the data on those logical units. In some implementations, an LUN can include multiple devices, e.g., several disk drives, that are logically presented as a single device.

In some embodiments, storage device 126 is a virtualized device. For example, hosts 110 can each include virtualization software, such as VERITAS Volume Manager™, that allows several storage devices, or a portion of each of several storage devices, to be treated as a single logical entity, and storage device 126 can be one of those logical entities. Alternatively, controllers 124(1) and 124(2) provide a virtualized representation of storage device 126 to hosts 110 in some embodiments.

Controllers 124(1) and 124(2) are each associated with a path via which hosts 110 can access storage device 126. Controllers 124(1) and 124(2) provide active/passive access to storage device 126, such that only one of the paths is active at any given time, and I/O operations are only allowed via the active path. In the illustrated embodiment, the active path is determined by which of controllers 124(1) and 124(2) currently "owns" storage device 126. The owning controller is the only controller allowed to access storage device 126. If controller 124(1) is currently the owner of storage device 126, the active path passes through controller 124(1). In other words, hosts 110 can only perform I/O operations via the path passing through controller 124(1) if controller 124(1) owns storage device 126. Similarly, when controller 124(2) is the owner of storage device 126, the active path passes through controller 124(2). While in this example each controller 124(1) and 124(2) is associated with a single path, it is noted that similar controllers can be associated with multiple paths in other embodiments. In such embodiments, the controllers can provide active/passive access such that multiple paths can be active at the same time, so long as those paths are all associated with the active controller.

It is noted that, depending on the configuration of storage array 120, active and passive paths can be independently determined for each storage device. For example, if active/passive access is independently determined relative to each storage device, and if there are multiple storage devices (not shown) in storage array 120, a different path can be the active path for each different storage device. For example, the active path to one storage device can pass through controller 124(1), at the same time that the active path to another storage device passes through controller 124(2). In contrast, if active/passive access is determined relative to each controller, then the active path for each storage device in storage array 120 will pass through the same controller.

Controllers 124(1) and 124(2) implement auto-trespass functionality. Auto-trespass can also be referred to as auto-failover. When auto-trespass is enabled, controllers 124(1) and 124(2) will perform an automatic failover (also referred to as an auto-trespass failover) between themselves if an I/O operation is attempted via a path associated with the currently passive controller. For example, assume controller 124(1) is currently the passive controller and controller 124(2) is currently the active controller (i.e., a path associated with controller 124(2) is currently the active path). If controller 124(1) detects an I/O command on I/O port 122(1), controller 124(1) automatically initiates a failover from controller 124(2), causing the controllers to switch roles. After the failover, controller 124(1) is the active controller and can now cause storage device 126 to perform an I/O operation requested by the I/O command received on I/O port 122(1). In some embodiments, automatic failovers between controllers 124(1) and 124(2) are transparent to the host that sent the I/O command that led to the automatic failover.

After an automatic failover is performed between controllers 124(1) and 124(2), the auto-trespass functionality of at least one of the controllers (e.g., the controller that is associated with the path that was the active path prior to the automatic failover) is inhibited. For example, assume controller 124(1) assumes the role of active controller in response to an automatic failover, which was initiated in response to controller 124(1) detecting an I/O command on the passive path passing through controller 124(1). Subsequent to the automatic failover, controller 124(2) is the passive controller. When controller 124(2) assumes the role of passive controller, controller 124(2) also disables its auto-trespass functionality. As a result of auto-trespass being disabled, if controller 124(2) detects an I/O command on the passive path (which now passes through controller 124(2)), controller 124(2) will not initiate another automatic failover. It is noted that controller 124(1) (and any other controllers present in the system) can also disable their auto-trespass functionality subsequent to an automatic failover being performed.

While auto-trespass functionality on a passive controller is disabled, I/O operations to storage device 126 via the passive controller will not be allowed. Accordingly, if a host initiates an I/O operation via a passive path associated with the passive controller, the passive controller can generate an error to the initiating host. For example, the passive controller can return a device-level error (e.g., a SCSI error) to the host. The passive controller can alternatively cause an interconnect-level error (e.g., a Fibre Channel port login error) to be returned to the host and/or cause a host's login to a network fabric port on the passive path to be revoked. In some embodiments, instead of actively generating an error indication, a passive controller can simply do nothing and allow the I/O operation to timeout, which will also alert the host to the error.

In some embodiments, controllers 124(1) and 124(2) automatically re-enable their auto-trespass functionality a short while after disabling it. Thus, each time an auto-trespass failover occurs, auto-trespass functionality can be temporarily disabled. During the time that auto-trespass is disabled, any host-initiated I/O operations on the passive path will generate errors. DMP modules 112 in hosts 110 will detect these errors and assume that the passive path is failed. Accordingly, DMP modules 112 will reroute their respective host's I/O operations on another path. If the duration of time during which auto-trespass is disabled is relatively long (relative to the frequency with which each host generates I/O operations to storage device 126), all of the hosts 110 are likely to learn that the formerly-active path is failed and be rerouted to another path. Thus, even though DMP modules 112 on hosts 110 may not communicate with each other to reach a consensus about which path is the current active path, the behavior of the DMP modules can nevertheless converge so that they are all routing I/O operations on the new active path.

In some embodiments, auto-trespass can be disabled by updating a flag maintained by each controller 124 (or within each controller that is a passive controller subsequent to the automatic failover). The updated value of the flag indicates that auto-trespass has been disabled. Accordingly, until the value of the flag is reset to a value corresponding to auto-trespass being enabled, the controller that maintains that flag will not initiate an automatic failover in response to detecting an I/O command on a passive path. The flag can be updated by each controller (e.g., each controller can independently update its flag in response to detecting the automatic failover). Alternatively, the flag can be updated by the current active controller (e.g., upon assuming the role of active controller due to the automatic failover, the active controller can send a command to each of the passive controllers, causing them to update their flags). In such an embodiment, the active controller can also control when the passive controllers re-enable auto-trespass.

In other embodiments, auto-trespass is disabled in different ways. For example, the active controller can temporarily shut down each passive controller, effectively disabling auto-trespass. As this and the above example show, auto-trespass functionality in a given controller can be disabled by that controller or by another controller (e.g., the active controller).

Controllers 124 can determine how long to disable auto-trespass functionality in a variety of different ways. In one embodiment, each controller 124 includes a counter, which is initialized to a particular value. When an auto-trespass failover occurs, the controller begins incrementing or decrementing the value in the counter until it reaches a pre-defined threshold value. In one embodiment, this pre-defined threshold value is set by an administrator. When the counter's value equals the pre-defined threshold value, auto-trespass functionality is re-enabled. In another embodiment, each controller 124 has access to a time source. Controllers 124 can be configured to access the time source to determine when the automatic failover occurs (e.g., a timestamp can be generated when the automatic failover occurs). Controllers 124 can then wait for a pre-specified duration (e.g., five minutes) before re-enabling auto-trespass. Alternatively, controllers 124 can be configured to re-enable auto-trespass (if auto-trespass has been disabled) at pre-defined intervals. For example, if auto-trespass is disabled anytime between 10:00 AM and 10:14 AM, controllers 124 can be configured to re-enable auto-trespass at 10:15 AM. The magnitude of the threshold value or the length of the duration or interval can be dynamically adjusted (e.g., by an administrator or automatically in response to operating conditions) in some embodiments.

Auto-trespass can also be re-enabled based on the occurrence of certain events. For example, when an automatic failover occurs, controllers 124 can log an error and/or generate an error indication, for example, by sending an email to an administrator or turning on an LED (Light Emitting Diode). Controllers 124 can then continue to keep auto-trespass disabled until an administrator manually re-enables auto-trespass. Alternatively, controllers 124 can re-enable auto-trespass in response to conditions indicating that a true failure of the active path has occurred. For example, controllers 124 can track the number of times hosts attempt to initiate I/O operations on each passive path. If the number of attempts on a given passive path equals or exceeds a pre-defined threshold number, controllers 124 can re-enable auto-trespass. In some embodiments, the number of attempts to initiate an I/O operation via a passive path is tracked separately for each host. If the same host attempts an I/O via the passive path more than once (e.g., indicating that the host has attempted to perform an I/O operation via the active path but was unsuccessful in its attempt), the auto-trespass functionality of the passive controller can be re-enabled.

The length of time that auto-trespass functionality is disabled can vary among paths; controllers, and/or storage devices. For example, while all controllers can disable auto-trespass upon detection of an automatic failover, some controllers can disable auto-trespass for a shorter duration than other controllers. In another embodiment, one path (or group of paths associated with a particular controller) is preferred over the other paths (or groups of paths) associated with other controller(s). The preferred path can be, for example, a path that has more bandwidth than another path. In such a situation, if an automatic failover causes a path other than the preferred path to become the active path, auto-trespass can be disabled for a shorter time than it would be if the automatic failover had designated the preferred path as the active path. It is noted that if there are more than two paths and/or controllers, there can be several different levels of preference, and thus the duration for which auto-trespass is disabled can vary for each of the paths and/or controllers.

As an example of how auto-trespass can be temporarily disabled among a group of controllers, assume controller 124(1) is currently the active controller, with respect to storage device 126, and that auto-trespass is currently enabled between controllers 124(1) and 124(2). The DMP modules 112 on both hosts 110 are routing I/O operations to storage device 126 via the path that passes through controller 124(1). At this time, host 110(1) sends an I/O command to storage device 126 via controller 124(1). Due to a transient error in the system, host 110(1) receives an error for this I/O command. DMP module 112(1) detects the error, assumes that the path through controller 124(1) has failed, and begins rerouting I/O operations to the path through controller 124(2). As part of this action, DMP module 112(1) causes the failed I/O operation to be retried via the path that passes through controller 124(2).

When controller 124(2) detects the retried I/O operation on I/O port 122(2), controller 124(2) is still the passive controller for storage device 126. Since auto-trespass is enabled, controller 124(2) communicates with controller 124(1) to initiate an automatic failover from controller 124(1). After the automatic failover, the controllers have switched roles, so that controller 124(1) is the passive controller and controller 124(2) is the active controller. Since controller 124(2) has now assumed the role of active controller, controller 124(2) handles the retried I/O command, causing the I/O operation initiated by that I/O command to be performed to storage device 126. Also, because an auto-trespass failover has just occurred, the auto-trespass functionality of controllers 124 is disabled.

DMP module 112(2) on host 110(2) is unaware of the changes that have taken place in DMP module 112(1). In other words, DMP module 112(2) does not know that DMP module 112(1) has begun using the path through controller 124(2) as the active path to storage device 126. Instead, DMP module 112(2) continues to assume that the path through controller 124(1) is the active path to storage device 126. Accordingly, the next I/O operation generated by host 110(2) to storage device 126 is routed via the path through controller 124(1).

Since controller 124(1) is now the passive controller, controller 124(1) would initiate another automatic failover upon detecting the I/O operation from host 110(2) if auto-trespass were enabled. However, since auto-trespass has been disabled, controller 124(1) does not initiate an automatic failover. Instead, host 110(2) receives an error indication (e.g., a fabric port login revocation or error, a device-level error, or an I/O operation timeout) for the I/O operation initiated via the path through controller 124(1). DMP module 112(2) detects this error and reroutes I/O operations to storage device 126 on the path through controller 124(2). As a result, host 110(2) is now using the same path as host 110(1).

Now that both hosts' DMP modules are routing I/O operations on the same path, the hosts can generate I/O operations to storage device 126 without causing "ping-ponging" of the active role between the controllers 124. As this example shows, temporarily disabling auto-trespass can lead to the DMP modules converging on the same path, even though there is no communication between the DMP modules.

Figure 2:
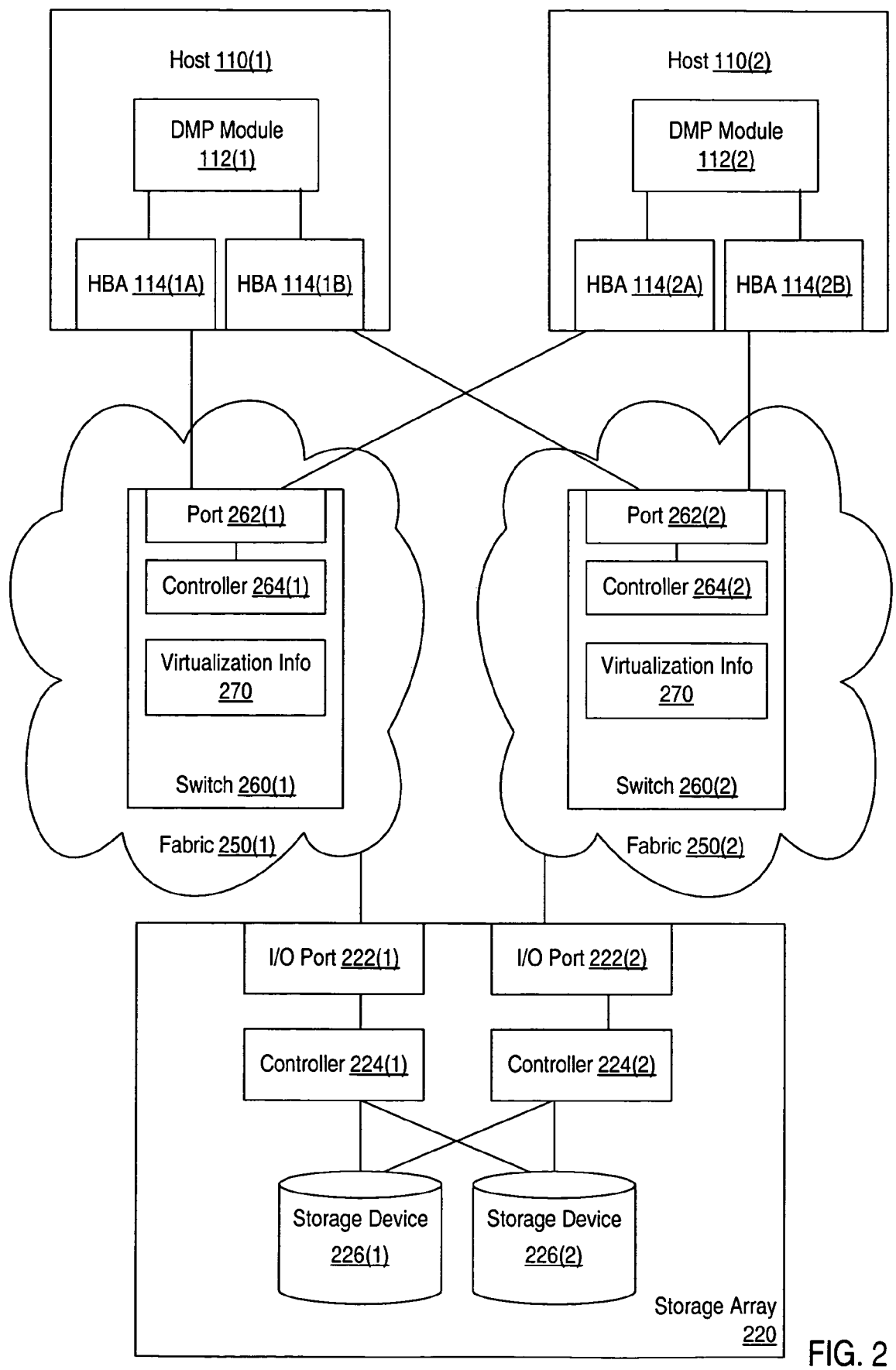
FIG. 2 is a block diagram of another storage system that includes several intelligent switches that provide an A/P interface to a storage volume, according to one embodiment of the present invention.

FIG. 2 shows another system in which auto-trespass is temporarily disabled after an automatic failover. In this example, two hosts 110(1) and 110(2) access a storage array 220. The hosts in FIG. 2 include similar components and operate similarly to the hosts in FIG. 1. Storage array 220 includes two I/O ports 222(1) and 222(2), two controllers 224(1) and 224(2), and two storage devices 226(1) and 226(2). Storage devices 226(1) and 226(2) can both be accessed via either controller 224(1) and 224(2).

In this example, hosts 110 access storage array 220 via two network fabrics 250(1) and 250(2). In particular, hosts 110(1) and 110(2) can each access storage array 220 via two different paths. One path passes through intelligent switch 260(1), which is included in fabric 250(1). The other path passes through intelligent switch 260(2), which is included in fabric 250(2). As shown, fabrics 250(1) and 250(2) are each coupled to a respective one of I/O ports 222(1) and 222(2) in storage array 220. Fabrics 250(1) and 250(2) are Fibre Channel fabrics in some embodiments. It is noted that each intelligent switch can be associated with multiple paths to storage array 220 in other embodiments.

Intelligent switch 260(1) includes a port 262(1) and a controller 264(1). Port 262(1) communicates with hosts 110. Controller 264(1) handles I/O commands received via port 262(1) (e.g., by providing those I/O commands to virtualization software). Intelligent switch 260(2) includes a similar port, port 262(2), and a similar controller, controller 264(2).

Intelligent switches 260 differ from non-intelligent switches in that intelligent switches 260 include virtualization functionality. In this example, intelligent switches 260(1) and 260(2) each maintain virtualization information 270 in order to present the same virtualized volume, which represents physical storage within one or more of storage devices 226(1) and 226(2), to hosts 110(1) and 110(2). In one embodiment, intelligent switches 260(1) and 260(2) each execute virtualization software that provides this functionality. Controllers 264(1) and 264(2) coordinate so that intelligent switches 260 provide active/passive access to volume. Controllers 264(1) and 264(2) also implement auto-trespass functionality. Controllers 264 are each implemented in software (e.g., as part of the virtualization software used to virtualize the volume) in some embodiments.

Thus, switches 260(1) and 260(2) operate to provide hosts 110 with active/passive access to the volume. In other words, hosts 110 can only access the volume via the active intelligent switch (with respect to that volume) of intelligent switches 260(1) and 260(2). In some embodiments, if intelligent switches 260 present several virtualized volumes to hosts 110, access to each different volume can be determined independently (i.e., intelligent switch 260(1) can be the active switch for one volume at the same time as intelligent switch 260(2) is the active switch for another volume). It is noted that intelligent switches 260 can communicate with each other (e.g., either periodically or upon failovers) in order to maintain consistent representations of the volume with each other (e.g., by maintaining consistent virtualization information 270).

Intelligent switches 260(1) and 260(2) implement auto-trespass functionality with respect to the volume. Thus, if an I/O command addressed to the volume is received by the passive intelligent switch for the volume, that intelligent switch will initiate an automatic failover in order to become the active intelligent switch. Intelligent switches 260(1) and 260(2) also temporarily disable auto-trespass functionality after performing an automatic failover, using techniques similar to those described above with respect to the storage array controllers (controllers 124) of FIG. 1.

As an example of how the system of FIG. 2 operates, assume that auto-trespass is enabled on intelligent switches 260. With respect to the volume virtualized by both intelligent switches, intelligent switch 260(2) is currently the active intelligent switch and intelligent switch 260(1) is currently the passive intelligent switch. In other words, hosts 110 can only perform I/O operations to the volume via intelligent switch 260(2). Now, host 110(1) initiates an I/O operation to the volume via intelligent switch 260(2). However, due to a transient error, host 110(1) receives an error for this I/O operation. DMP module 112(1) on host 110(1) detects this error and reroutes I/O operations to the volume over the passive path, which passes through intelligent switch 260(1). Accordingly, host 110(1) retries the I/O operation on the passive path through intelligent switch 260(1).

Upon detecting the attempt to initiate I/O operation via intelligent switch 260(1) by host 110(1), intelligent switch 260(1) initiates an automatic failover. Intelligent switches 260(1) and 260(2) exchange roles during the automatic failover, such that intelligent switch 260(1) becomes the active intelligent switch with respect to the volume. Also, as a result of performing the automatic failover, auto-trespass is disabled between intelligent switches 260.

DMP module 112(2) on host 110(2) is not aware that DMP module 112(1) has begun rerouting I/O operations on the path that passes through intelligent switch 260(1). Instead, DMP module 112(2) continues to assume that the path passing through intelligent switch 260(2) is the active path for the volume. DMP module 112(2) continues to route I/O operations addressed to the volume via intelligent switch 260(2). However, since auto-trespass has been disabled, intelligent switch 260(2), which is now the passive switch with respect to the volume, will not initiate an automatic failover when intelligent switch 260(2) receives one of these I/O commands from host 110(2). Instead, intelligent switch 260(2) will cause host 110(2) to receive an error for that I/O command (e.g., by returning an appropriate device- or interconnect-level error or by allowing the command to timeout). DMP module 112(2) on host 110(2) detects this error and begins rerouting I/O operations to the volume via the active intelligent switch, intelligent switch 260(1). At this point, DMP modules 112 are both using the same path as the active path.

As noted above, intelligent switches 260 are Fibre Channel devices in some embodiments. In such embodiments, whenever an automatic failover occurs, the intelligent switch that becomes the passive intelligent switch due to the automatic failover can immediately cause any hosts 110 that are logged into that intelligent switch's Fibre Channel ports, for the purposes of accessing the volume, to be logged out (e.g., the intelligent switch can revoke the hosts' P-LOGI). Additionally, while auto-trespass is disabled, the passive intelligent switch can prevent any hosts from logging into that intelligent switch's Fibre Channel ports for the purposes of accessing the volume.

While the example shown in FIG. 2 shows a storage system in which two intelligent switches are each associated with a single path to a storage volume, other embodiments can be implemented in which a single intelligent switch provides active/passive access to a storage volume. For example, such an intelligent switch can include several ports, and each port can have an associated controller. The ports can be physical ports or virtual ports. If the ports are virtual ports, the ports will exhibit fabric personality (e.g., each port can have a unique world wide port name), but the ports may not have a 1:1 correspondence with physical ports (e.g., there can be several logical ports per physical port). The controllers, which are all part of the same intelligent switch, coordinate with each other to provide active/passive access to the storage volume via the ports. The controllers can implement auto-trespass functionality and disable auto-trespass if an automatic failover occurs.

In another alternative embodiments, hosts 110 have active/passive access to the volume via switches 260(1) and 260(2) (i.e., for a given volume, I/O commands can only be sent via the active intelligent switch of intelligent switches 260(1) and 260(2)), while intelligent switches 260(1) and 260(2) can have active/active access to storage array 220 (i.e., if multiple paths are available between the active intelligent switch and storage array 220, the active intelligent switch can simultaneously send I/O commands to storage array 220 via more than one of the paths). Similarly, if each intelligent switch 260 includes several ports (physical or virtual), each controller 264 can provide active/active access to the volume via those ports whenever that controller is the active controller with respect to the volume.

Figure 3:
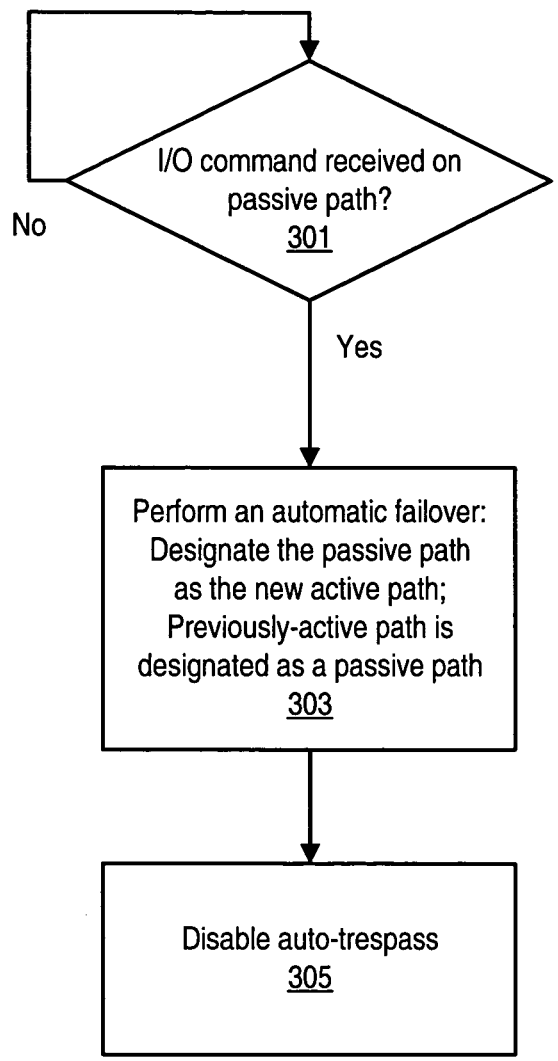
FIG. 3 is a flowchart of a method of temporarily disabling auto-trespass, according to one embodiment of the present invention.

FIG. 3 is a flowchart of a method of disabling auto-trespass subsequent to an automatic failover in a storage system that provides A/P access to a storage device (e.g., a logical volume, a logical unit, and the like). If an I/O command is received on a passive path while auto-trespass is enabled, as determined at 301, an automatic failover is performed (at 303), and auto-trespass is disabled (at 305). During the automatic failover performed at 303, the passive path upon which the I/O command was received exchanges roles with the active path, such that the passive path becomes the active path and vice versa. If no I/O commands are received on the passive path (as detected at 301), the active path and passive path continue to maintain their roles.

The active and passive paths can be associated with a variety of different devices. These devices can include hardware and/or software components. For example, in one embodiment, the active and passive paths are associated with different array controllers in a multi-ported storage array (e.g., similar to the embodiment shown in FIG. 1). In other embodiments, the active and passive paths are associated with network fabric switches (e.g., like those in the example shown in FIG. 2). Accordingly, the method of FIG. 3 can be performed by an array controller, a network fabric switch, or another device that is associated with a path to a storage device. For example, detecting an I/O command on the passive path, as shown at 301, can involve monitoring an I/O port (e.g., in a storage array or network fabric switch) associated with the passive path for host I/O commands.

Performing an automatic failover, as shown at 303, involves several devices participating in activity that exchanges the active and passive roles. For example, an active device, associated with the active path, can exchange roles with a passive device in response to the passive device detecting an I/O command on the passive path associated with the passive device. Other devices (e.g., other intelligent switches, array controllers, or the like) associated with other passive paths can also detect this automatic failover, even if these devices are not exchanging roles during the automatic failover (e.g., state information maintained by those devices can be updated each time an automatic failover occurs). The auto-trespass functionality of these devices can also be disabled upon detection of the automatic failover.

Auto-trespass is disabled (as shown at 305) by disabling the auto-trespass functionality of at least one such device. For example, the auto-trespass functionality of the device associated with the path that was the active path prior to the automatic failover is disabled. In some embodiments, the auto-trespass functionality of the active device and/or other passive devices is also disabled. The auto-trespass functionality of a device can be disabled by the device itself or by another device (e.g., the device associated with the active path) upon detection of an automatic failover.

While auto-trespass is disabled, as shown at 305, hosts cannot initiate I/O operations to the storage device via the passive path (or paths, if there are more than two paths used to provide A/P access to the storage device). Instead, hosts attempting to use the passive path as the active path to the storage device will detect errors, which in turn causes DMP modules in the hosts to retry and/or reroute I/O operations onto another path.

Figure 4:
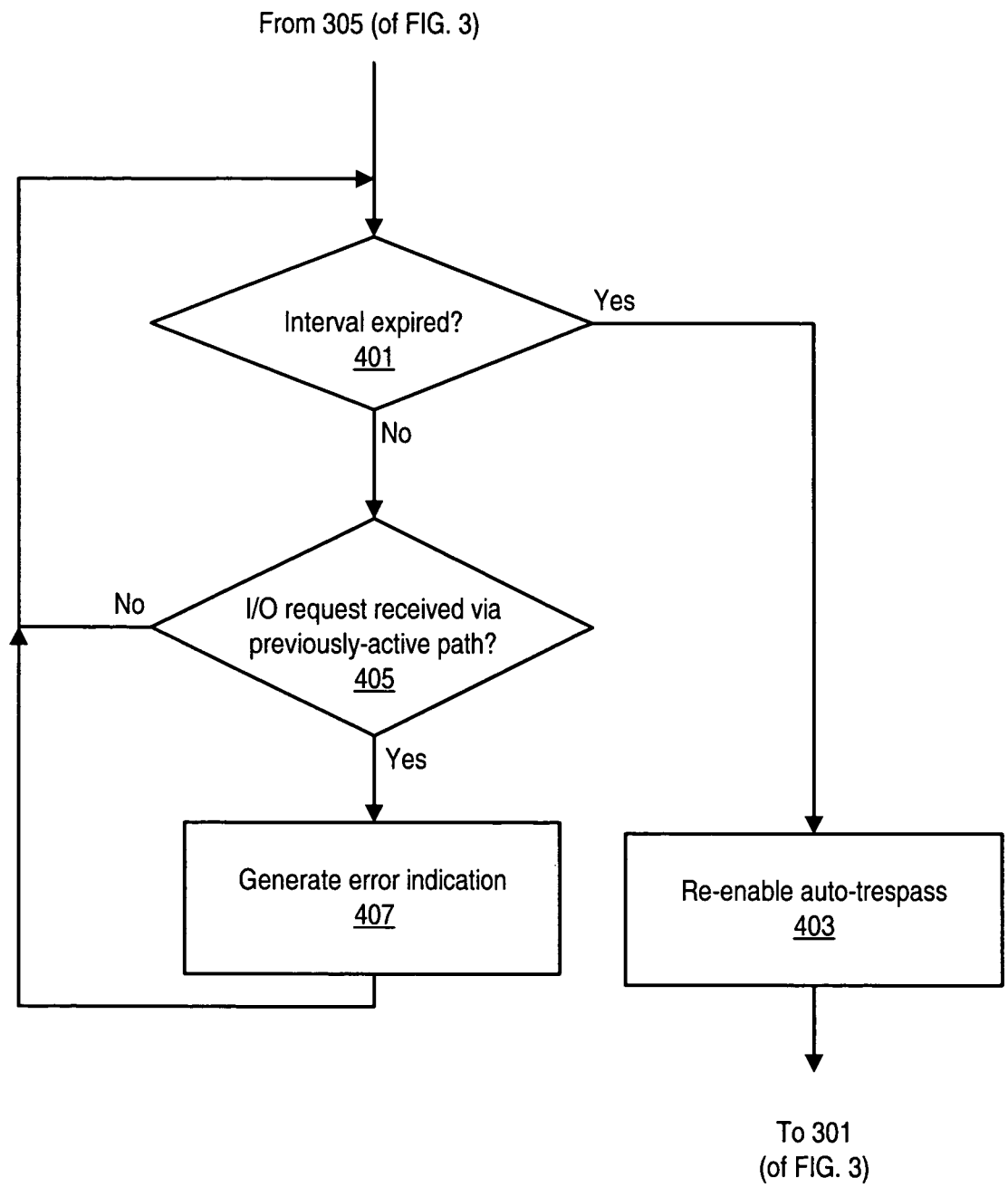
FIG. 4 is a flowchart of a method of operating a device while auto-trespass is temporarily disabled, according to one embodiment of the present invention.

FIG. 4 is a flowchart of a method of operating a device while auto-trespass is temporarily disabled. In this example, auto-trespass is disabled for some interval (e.g., as determined by use of a counter or time source). The method begins when auto-trespass is disabled, at 305 of FIG. 3. If the interval for disabling auto-trespass has expired, as determined at 401, auto-trespass is re-enabled, as shown at 405, and normal operation resumes (e.g., as shown at 301 of FIG. 3). Determining whether the interval has expired can involve determining whether a pre-defined time has elapsed. For example, when auto-trespass is disabled, each passive path can begin decrementing a counter from a preset value. When the counter reaches a minimum value, the time has elapsed and auto-trespass can be re-enabled. Alternatively, determining whether the interval has expired can involve checking whether a pre-defined set of conditions have occurred (e.g., such conditions can include an administrator manually re-enabling auto-trespass, in which case function 403 does not need to performed). In some embodiments, the interval begins when auto-trespass is disabled.

If the interval has not yet expired, and if a communication is received via the previously-active (prior to the automatic failover at 303 of FIG. 3) path (or any of the other passive paths), an error indication corresponding to the previously-active path is generated, as shown at 405-407. The error indication can include device-level errors (e.g., SCSI errors) as well as interconnect-level errors (e.g., fabric login errors). These error indications can be actively generated by an controller in the passive path (e.g., the controller can cause an appropriate SCSI error or fabric login error to be returned to the host attempting I/O operations via the passive path) or passively generated (e.g., the controller can cause the I/O operation to timeout by simply not responding to the I/O command from the host). If, for example, the error indications are login errors, a Fibre Channel port in the previously-active path (now a passive path) can revoke the Fibre Channel login(s) of any host(s) that are currently logged in to that port as soon as auto-trespass is disabled. The Fibre Channel port can then refuse to allow any hosts to login to that port as long as auto-trespass is disabled.

Figure 5:
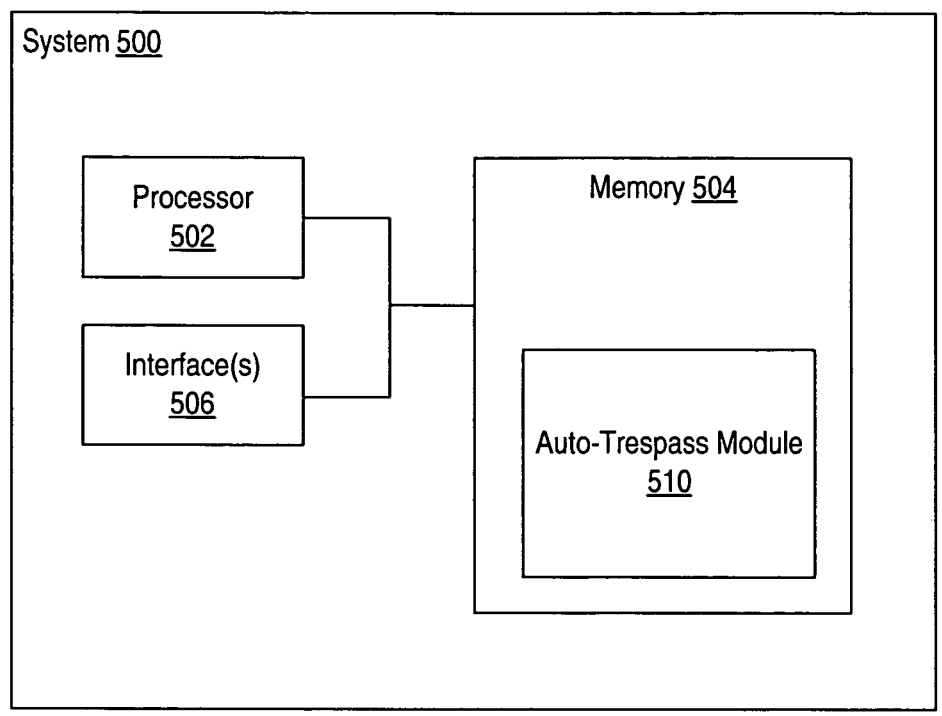
FIG. 5 illustrates how an auto-trespass controller can be implemented in software, according to one embodiment of the present invention.

FIG. 5 illustrates how an auto-trespass module that temporarily disables auto-trespass functionality (e.g., by implementing the methods shown in FIG. 3 and/or FIG. 4 above), can be implemented in software in some embodiments. Here, system 500 (e.g., one of controllers 264 in one of switches 260 of FIG. 2 or an array controller in a storage array 120 of FIG. 1) includes one or more processors 502, memory 504, and one or more interface(s) 506, which are coupled by a bus or other interconnect. Processor 502 can be a microprocessor, PLD (Programmable Logic Device), ASIC (Application Specific Integrated Circuit), or other device configured to execute program instructions stored in memory 504. Memory 504 can include various types of RAM (Random Access Memory), ROM (Read Only Memory), Flash memory, MEMS (Micro Electro-Mechanical Systems) memory, and the like. Interface(s) 506 can include one or more network interfaces that allow various programs executing on system 500 to send and receive information via a network (e.g., interfaces 506 can include I/O ports 122(1) and 122(2) of FIG. 1). Interface(s) 506 can also include interfaces to various peripherals (e.g., such as storage device 126 of FIG. 1).

Instructions and data implementing auto-trespass module 510 are stored in memory 504 for execution by processor 502. Auto-trespass module 510 is configured to disable auto-trespass when an automatic failover occurs. Auto-trespass module 510 can also be configured to re-enable auto-trespass at a later time. For example, as described above, auto-trespass module 510 can re-enable auto-trespass based on the occurrence of certain conditions or upon a certain amount of time elapsing. Furthermore, while auto-trespass is disabled, auto-trespass module 510 can cause error indications to be returned to a host attempting I/O operations to a storage device via a passive path.

It is noted that in alternative embodiments, auto-trespass module 510 is implemented in hardware or in a combination of hardware and software instead of being implemented in software. For example, auto-trespass module 510 can be implemented in an ASIC configured to perform the same functions as the program instructions shown in FIG. 5.

The program instructions and data implementing auto-trespass module 510 can be stored on various computer readable media such as memory 504. In some embodiments, such software is stored on a computer readable medium such as a CD (Compact Disc), DVD (Digital Versatile Disc), hard disk, optical disk, tape device, floppy disk, and the like). In order be executed by processor 502, the instructions and data implementing auto-trespass module 510 are loaded into memory 504 from the other computer readable medium. The instructions and/or data can also be transferred to system 500 for storage in memory 504 via a network such as the Internet or upon a carrier medium. In some embodiments, a computer readable medium is a carrier medium such as a network and/or a wireless link upon which signals such as electrical, electromagnetic, or digital signals, on which the data and/or instructions implementing auto-trespass module 510 are encoded, are conveyed.

Although the present invention has been described with respect to specific embodiments thereof, various changes and modifications may be suggested to one skilled in the art. It is intended such changes and modifications fall within the scope of the appended claims.

What is claimed is:

1. A method comprising:
    detecting an auto-trespass failover from a first path to a second path, wherein
        the auto-trespass failover is performed in response to an I/O command being sent via the second path, and
        the second path is a passive path prior to the auto-trespass failover; and
    inhibiting auto-trespass failovers between the first path and the second path subsequent to the auto-trespass failover.

2. The method of claim 1, wherein
    a first plurality of paths comprises the first path,
    the first plurality of paths is associated with a first controller,
    a second plurality of paths comprises the second path,
    the second plurality of paths is associated with a second controller, and
    the inhibiting auto-trespass failovers comprises disabling auto-trespass functionality of the first controller subsequent to the auto-trespass failover.

3. The method of claim 1, further comprising:
    inhibiting I/O operations via the first path while the auto-trespass failovers are disabled.

4. The method of claim 3, wherein the inhibiting I/O operations via the first path comprises:
    generating an error indication in response to an I/O command being sent via the first path while auto-trespass failovers are disabled.

5. The method of claim 4, wherein the error indication comprises a SCSI (Small Computer Systems Interface) error.

6. The method of claim 3, wherein the inhibiting I/O operations via the first path comprises:
    generating a login error corresponding to a network fabric port coupled to the first path.

7. The method of claim 6, further comprising:
    revoking a preexisting login to the network fabric port in response to the auto-trespass failover.

8. The method of claim 1, further comprising:
    ceasing to inhibit the auto-trespass failovers subsequent to the expiration of a period.

9. The method of claim 8, wherein the period is initiated in response to the auto-trespass failover.

10. The method of claim 8, wherein the duration of the period is dependent upon at least one of: which of a plurality of paths is currently designated as the active path and which of the plurality of paths is currently designated as the passive path.

11. The method of claim 8, wherein the duration of the period is set by an administrator.

12. The method of claim 1, wherein the performing the auto-trespass failover comprises:
    failing over from a first controller to a second controller, the first controller and the second controller comprised in a multi-ported disk array.

13. The method of claim 1, wherein the first auto-trespass failover comprises:
    failing over from a first switch to a second switch, the first switch and the second switch comprised in a network fabric.

14. The method of claim 13, wherein the first switch and the second switch each operate to virtualize a first storage volume.

15. A system comprising:
    a port configured to receive an I/O command from a host; and
    a controller coupled to the port, wherein
        the controller is configured to participate in an automatic failover between the controller and an additional controller, wherein the automatic failover is performed in response to a first I/O command being sent to a passive controller, and
        the controller is configured to disable auto-trespass if the automatic failover is performed.

16. The system of claim 15, wherein
    the controller is configured to re-enable auto-trespass after an interval has expired.

17. The system of claim 16, wherein
    the controller is designated as the passive controller by the automatic failover, and
    the controller is configured to inhibit I/O operations via the port while auto-trespass is disabled.

18. The system of claim 17, wherein
the controller is configured to inhibit I/O operations by generating an error indication in response to an I/O command being received via the port while auto-trespass is disabled.

19. The system of claim 15, wherein
the controller is an array controller of a multi-ported disk array, and
the port is one of a plurality of ports of the multi-ported disk array.

20. The system of claim 15, wherein
the controller and the port are comprised in a network fabric switch.

21. A non-transitory computer readable storage medium comprising program instructions executable to:
detect an auto-trespass failover from a first path to a second path, wherein
the auto-trespass failover is performed in response to an I/O command being sent via the second path, and
the second path is a passive path prior to the auto-trespass failover; and
inhibit auto-trespass failovers between the first path and the second path subsequent to the auto-trespass failover.

22. The non-transitory computer readable storage medium of claim 21, wherein the program instructions are further executable to:
cease to inhibit the auto-trespass failovers subsequent to the expiration of a period.

23. The non-transitory computer readable storage medium of claim 21, wherein performing the auto-trespass failover comprises:
failing over from a first switch to a second switch, the first switch and the second switch comprised in a network fabric.

24. A system comprising:
means for receiving I/O commands via a network;
means for participating in an auto-trespass failover from a first path to a second path, wherein
the means for participating are coupled to the means for receiving I/O commands,
the auto-trespass failover is performed in response to an I/O command being sent via the second path, and
the second path is a passive path prior to the auto-trespass failover; and
means for inhibiting auto-trespass failovers between the first path and the second path subsequent to the auto-trespass failover.

25. The system of claim 24, wherein
the means for inhibiting auto-trespass failovers cease to inhibit the auto-trespass failovers subsequent to the expiration of a period.

26. The system of claim 24, wherein performing the auto-trespass failover comprises:
failing over from a first switch to a second switch, the first switch and the second switch comprised in a network fabric.

* * * * *